US007587929B2

(12) United States Patent
Zielinski et al.

(10) Patent No.: US 7,587,929 B2
(45) Date of Patent: Sep. 15, 2009

(54) JOINT COMBINED AIRCREW SYSTEMS TESTER

(75) Inventors: David Edward Zielinski, Lisle, IL (US); Timothy Robert Schmidt, Bollingbrook, IL (US); Douglas Wayne Eaton, Wheaton, IL (US)

(73) Assignee: Scot Incorporated, Downers Grove, IL (US)

( * ) Notice: Subject to any disclaimer, the term of this patent is extended or adjusted under 35 U.S.C. 154(b) by 297 days.

(21) Appl. No.: 11/518,161

(22) Filed: Sep. 11, 2006

(65) Prior Publication Data

US 2007/0125164 A1 Jun. 7, 2007

Related U.S. Application Data

(60) Provisional application No. 60/715,149, filed on Sep. 9, 2005.

(51) Int. Cl.
*G01D 18/00* (2006.01)
*G01D 21/02* (2006.01)

(52) U.S. Cl. ............................ 73/49.8; 73/46; 73/865.9

(58) Field of Classification Search ............ 73/40–49.8, 73/865.9
See application file for complete search history.

(56) References Cited

U.S. PATENT DOCUMENTS

| | | | | |
|---|---|---|---|---|
| 3,039,295 | A * | 6/1962 | Le Mat et al. | 73/49.2 |
| 3,360,981 | A * | 1/1968 | Badger | 73/40 |
| 4,441,357 | A * | 4/1984 | Kahn et al. | 73/40 |
| 4,727,749 | A * | 3/1988 | Miller et al. | 73/46 |
| 4,846,166 | A * | 7/1989 | Willeke | 128/200.24 |
| 4,906,990 | A * | 3/1990 | Robinson | 340/945 |
| 4,926,680 | A * | 5/1990 | Hasha et al. | 73/46 |
| 5,289,819 | A * | 3/1994 | Kroger et al. | 128/200.24 |
| 5,318,018 | A * | 6/1994 | Puma et al. | 128/202.11 |
| 5,365,774 | A * | 11/1994 | Horlacher | 73/49.3 |
| 5,390,531 | A * | 2/1995 | Taylor | 73/40 |
| 6,245,009 | B1 * | 6/2001 | Travis et al. | 600/20 |
| 6,308,556 | B1 * | 10/2001 | Sagi et al. | 73/40 |
| 6,425,395 | B1 * | 7/2002 | Brewer et al. | 128/202.22 |
| 6,435,009 | B1 * | 8/2002 | Tilley | 73/40 |
| 6,820,616 | B1 * | 11/2004 | Jordan | 128/202.11 |
| 7,325,441 | B2 * | 2/2008 | Liu et al. | 73/40 |
| 7,415,864 | B1 * | 8/2008 | Israel et al. | 73/1.02 |
| 2001/0003917 | A1 * | 6/2001 | Sagi et al. | 73/40 |
| 2005/0109082 | A1 * | 5/2005 | Stewart et al. | 73/40 |
| 2005/0155607 | A1 * | 7/2005 | Martin et al. | 128/207.13 |

FOREIGN PATENT DOCUMENTS

WO WO 2004011095 A1 * 2/2004

* cited by examiner

*Primary Examiner*—David A. Rogers
(74) *Attorney, Agent, or Firm*—Robert E. Bushnell, Esq.

(57) ABSTRACT

A Joint Combined Aircrew Systems Tester (JCAST) that can be used to test aircrew integrated life support equipment currently authorized for use by aircrew members of the Air Force, Navy and Army. The JCAST will be capable of Chemical/Biological seal testing of all the Joint Service Aircrew Mask (JSAM) variants including the Type 2 JSAM for high performance aircraft. Like traditional Testers, the JCAST is capable of Performance and Fit Testing of masks at pressure levels, including COMBAT EDGE (Combined Advanced Technology Enhanced Design "G" Ensemble), consistent with aircraft supply levels. The JCAST provides an apparatus and technique for accurately measuring a leak rate for an elastic body such as a chemical mask at 0.5 sccm at 6 IWG. The JCAST is portable and light weight while providing novel leak testing using pressure decay.

21 Claims, 12 Drawing Sheets

FIG. 10

FEATURES

- Portable
- Unrestricted transport on military aircraft
- Eliminates the need for multiple test sets
- Self-Contained, No Bottled Gas Required
- Performs self test and system verification
- Performs helmet/mask fitting and troubleshooting
- Microphone and earphones testing
- Inflates the CSU 13 series anti-G suit in less than one minute
- Provides proper pressure and flows to enable complete functional testing of aircrew life support equipment
- Designed for In-shop, Field and Deployments
- Rugged Design
- Easily Upgradeable
- Battery Powered
- Operates in a Chemical Environment
- Flat Control Panel, Easy Clean
- Automated Testing
- PBG Breathing Levels Timeout for Aircrew Member Safety
- Redundant Overpressure Relief Valves

- JSAM Ready
- OBOGS Ready
- F-22 Rapid Decompression Testing
- Can make minor repairs to the tester at the operational level
  All accessories are contained within the unit

FIG. 11

TESTING CAPABILITIES

CHEMICAL/BIOLOGICAL MASK

- Quantitative Face-Fit Factor (QFF)
- CB Integrity Fit Factor (Face-Fit Independent)
- Drink Tube Flow Restriction
- Drink Train Leakage Test
- Drink Valve Seat Test
- Outlet Valve Test
- Low Flow Leakage Testing
- Blower Pressure Output Level
- Battery Output Level

LEAK TESTING

- Dynamic leak measurement
- Pressure decay (P-DROP)

COMMUNICATION

- Listen/Talk for all headsets, with intercom capability between technician and pilot
- Continuity test of microphone elements, earphone elements and cable harness
- Isolated test of Amplifiers for amplified microphones
- Stereo (L/R) tone testing of earpieces

BREATHING/PERFORMANCE/FIT

- NORMAL (3.25 in.H2O max)
- 41M (4 in.H2O @ 5 LPM)
- 43M (6 in.H2O) @ 5 LPM)
- 45M (8 in.H2O) @ 5 LPM)
- PBG (16-32 in.H2O) with Simultaneous G-Suit Fill

REGULATOR PERFORMANCE TESTING

- Nominal 70 PSI supply
- Nominal 5 PSI supply
- Limit testing

MISCELLANEOUS

- CRU/94 Cracking Pressure
- EEU 2 A/P Goggle Power

FIG. 12

SPECIFICATIONS

MECHANICAL
- Size .......... TBD
- Weight .......... TBD
- Case ..........
  .... Test Equipment Case w/ Removable Hinged Cover

OUPUT PRESSURE
- Mask Port § .......... 0-39 in.H2O (IWG)
- G-Suit Port § .......... 0-5 PSIG
- MMR Ports A,B & C § .......... 3-90 PSIG TEST SETTINGS
- Normal .......... 3.25 IWG Maximum
- 41M .......... 4.0 IWG @ 5 LPM
- 43M .......... 6.0 IWG @ 5 LPM
- 45M .......... 8.0 IWG @ 5 LPM
- PBG .......... 16.0-32.0 IWG
- G-Suit Pressure (PBG) .......... 58±5 IWG
- G-Suit Pressure (Leak, Pressure Decay) ... 138±5 IWG

TEMPERATURE LIMITS
- Operating .......... 0°C-50°C
- Storage .......... -40°C-75°C

ELECTRICAL INPUT
- Voltage .......... 90-132VAC / 180-264 VAC
- Frequency .......... 47-440 Hz

INDICATORS
- Mask Port Pressure .......... 0.0-50.0 IWG
- MMR Port Pressure .......... 0.0-100.0 PSIG
- G-Suit Port Pressure .......... 0.0-200.00 IWG
- Mask/MMR Flow .......... 0-10 000 sccm
- Leak Indication via Flow Sensor § ...... 5.0-5.5 LPM
- Pressure Decay Leakage Indication § ..........
  .......... 0.05-2.0LPM

COMM ELECTRICAL
- Active Noise Reduction (ANR) Power ..........
  .......... 24VDC, 0.2 A minimum
- Electret Mic Input Current ..........
  .......... 8 mA maximum, 10 VDC bias

Acceptable Continuity Indication
- Dynamic Microphone § .......... 4.0-7.5 Ω
- Carbon Microphone § .......... 80-500 Ω
- Earphones § .......... 8-15 Ω

Short indication
- Earphones, Dynamic § .......... < 2 Ω
- Carbon Microphone § .......... < 20 Ω

CHEMICAL/BIOLOGICAL
Non-aerosol particle detection
- Acceptable QFF § .......... ≥ 2000
- Acceptable % Leakage (CB Integrity) § ........ ≤ 0.003%

DRINK TUBE
- Acceptable Resistance, Static Flow Pressure Drop §
  .......... ≤ 2.2 IWG @ 2.2 LPM
- Acceptable Flow, Drink Valve Seated § ..........
  .......... ≤ 0.5 SCCM @ 6 IWG
- Acceptable Flow, Drink Train Leakage § ..........
  .......... ≤ 0.5 SCCM @ 6 IWG

OUTLET VALVE
- Acceptable Flow § .......... ≤ 15 SCCM @ 1 IWG

§ devotes values that are programable

- Metal Case, Removable cover & decontamination capable
- Size: 24 in. Long x 18 in. Deep x 16 in. High (target)
- Weight: Less than 75 LBS (target)

- Input Requirements
  - Power 115 or 230 VAC 40-400 Hz 2 Amps
  - No compressed air or oxygen required

- Temperature Limits
  - Operating 0°C to +50°C
  - Storage -40°C to 75°C

JOINT COMBINED AIRCREW SYSTEMS TESTER

CROSS REFERENCE TO RELATED APPLICATIONS

This application makes reference to, incorporates the same herein, and claims all benefits of a provisional application filed on Sep. 9, 2005 in the U.S. Patent Office and having Ser. No. 60/715,149.

BACKGROUND OF THE INVENTION

1. Field of the Invention

The present invention pertains to an improved aircrew systems tester that includes an apparatus that accurately detects leaks for elastic items such a chemical masks accurately down to 0.5 sccm.

2. Description of the Related Art

An aircrew systems tester is a device that tests various life support equipment used in conjunction with aviation. Such life support equipment includes oxygen masks. The tester is designed to determine whether the devices are working properly, whether leaks are present, and also whether the mask fittings are acceptable.

Recently, many advances have been made in the aircrew systems tester technology. For example, aircrew systems testers have become miniaturized so that bottles of compressed gas are no longer necessary. Also, the testing unit has become integrated so that other tests, besides mask tests, can be performed by the same tester. These include anti-gravity suit testing, microphone and earphone testing, along with helmet and mask fitting and troubleshooting.

One limitation in previous aircrew system testers is that testing can be performed only up to a certain pressure. This is problematical as man mounted regulators require a higher pressure than is available in previous aircrew testers. Also, there is a need to test chemical masks, including joint service aircrew masks (JSAMs) for chemical and biological testing by a portable tester.

Another problem is that elastic items, such as nuclear, biological or chemical masks (NBC masks) are required by the military must have a mask integrity of less than 0.5 sccm (standard cubic centimeters per minute). Traditional leak detection techniques, such as pressure decay, are inadequate in being able to accurately measure leak rates of 0.5 sccm at pressures of 6 IWG (inches of water gauge). This is because leak rates in elastic bodies vary dramatically with pressure and that by having the pressure within the device under test of an elastic item change during the test will produce inaccurate results. Therefore, there is currently a need for an apparatus and a technique that can accurately measure and detect leaks of 0.5 sccm at 6 IWG accurately in such elastic bodies.

SUMMARY OF THE INVENTION

It is therefore an object of the present invention to provide an improved design for a combined aircrew systems tester that can test a wide variety of life support equipment.

It is also an object of the present invention to provide an apparatus and technique for measuring mask integrity and accurately and confidently detect leaks of as little as 0.5 sccm in elastic bodies such as NBC masks.

It is still an object of the present invention to provide a design for an aircrew systems tester that can test Man Mounted Regulators (MMR).

It is further an object of the present invention to provide a small, portable, lightweight and integrated unit apparatus that can perform multiple leak tests on elastic bodies such as NBC masks and determine their integrity accurately and communicate the results to a user.

These and other objects can be achieved by a Joint Combined Aircrew Systems Tester (JCAST) that can be used to test aircrew integrated life support equipment currently authorized for use by aircrew members of the Air Force, Navy and Army. Additionally, the JCAST is capable of Chemical/Biological seal testing of all the Joint Service Aircrew Mask (JSAM) variants including the Type 2 JSAM for high performance aircraft. Like traditional Scot Incorporated Testers, the JCAST is capable of Performance and Fit Testing of masks at pressure levels, including COMBAT EDGE (Combined Advanced Technology Enhanced Design "G" Ensemble), consistent with aircraft supply levels.

Additionally, the JCAST provides higher pressure air required for the testing of Man Mounted Regulators (MMR). The Scot JCAST detects aircrew mask leaks and provide a means for fault isolation of component hardware. The JCAST provides functional checks of communication gear through its Listen/Talk feature and fault isolation by means of continuity testing. The JCAST has functionality to record test data and download information to a maintenance database for aircrew maintenance purposes. The Scot JCAST is easily upgradeable to accommodate any new pressure/flow schedule or audio test requirements to make this the last personal protective life support equipment tester needed.

According to one aspect of the present invention, there is provided a Joint Combined Aircrew Systems Tester (JCAST) that includes a display screen adapted to display text messages, a plurality of audio test ports and a plurality of circuits adapted to test headsets and microphones for continuity, tones and current drawn, a G-suit port adapted to connect to a G-suit, a plurality of Man Mounted Regulator (MMR) ports each adapted to a connect to all variants of MMRs, a drink tube port adapted to connect to a drink tube, a removable face form adapted to test mask integrity for nuclear, biological and chemical (NBC) masks and an internal gas plumbing adapted to test MMRs, drink tubes, a G-suit, oxygen masks, and NBC masks for leaks, the JCAST being an integrated and portable unit, the internal gas plumbing including a volumetric leak test definition plumbing adapted to accurately detect and measure leaks in elastic bodies including NBC masks for leaks as small as 0.5 sccm.

The JCAST can be adapted to output a pressure of 90 PSIG for a period for a sustainable breathing period through each of the plurality of MMR ports. The JCAST can be adapted to test a quantitative fit factor for NBC masks via particle counting, mask integrity via both particle counting and both pressurized and evacuated volumetric flow testing, drink train integrity via both particle counting and both pressurized and evacuated volumetric flow testing, drink tube seat both particle counting and both pressurized and evacuated volumetric flow testing, drink tube restriction via flow restriction testing and outlet valve seat via pressurized volumetric flow testing. The JCAST can be adapted to detect leaks as small as 0.5 sccm by keeping a elastic device under test (DUT) under constant pressure throughout the test and measuring a pressure drop in an accumulator used to supply air mass to the DUT.

The volumetric leak test definition plumbing can include a port adapted to allow for attachment to an elastic device under test (DUT), a 2.25 psi gas source, a low flow regulator adapted to deliver an air mass to the DUT and to keep the DUT at a constant pressure, even when the DUT leaks, at least one accumulator arranged between the regulator and the gas source and adapted to supply an air mass to the DUT via the regulator and the port, the at least one accumulator being further adapted to provide a condition where a pressure drop within the at least one accumulator and a quantity of air mass leakage have a known relationship and an electrically controlled valve adapted to cut off the gas source from the at least one accumulator, the regulator and the port, the port being on an opposite side of the regulator than the at least one accumulator. The at least one accumulator can include a first accumulator of 150 cc and a second accumulator of 10 cc, the JCAST being adapted to determine a leak rate of the DUT attached to the port by measuring a pressure drop in the first and the second accumulators and keeping track of elapsed time. The volumetric flow testing leak test being can be automated in that a single button push causes pressurization of a device under test and accumulator, closing of the electrically controlled valve, recording recording an initial and a final pressure within the at least one accumulator and calculation of a leak rate for the DUT. The volumetric leak test definition plumbing can be further adapted to detect and measure leak rates in elastic bodies as small as 0.5 sccm by each of holding the elastic device under test at a constant pressure of +6 IWG (pressurized leak test) and at −6 IWG (evacuated leak test). The pushing of the single button on said JCAST can automatically cause the JCAST to pressurize the DUT to are required test pressure, determine whether a pressure of the DUT has stabilized, read $P_{2DUT}$, $T_{aDUT}$ and $t_{DUT}$ and calculate $L_{DUT}$.

The JCAST can be further adapted to perform a vacuum channel leak test measuring a leak rates as small as 0.05 sccm of a seal between an NBC mask and the faceform by a plumbing including said faceform comprising vacuum channels at where an NBC mask is sealed to the faceform, an evacuated pressure source, a 150 cc accumulator, a 1 IWG differential pressure gauge arranged between the accumulator and the faceform and adapted to measure a pressure difference between the vacuum channels within the faceform and the accumulator and at least two electrically activated valves adapted to cut off the evacuated pressure source from the accumulator, the differential pressure gauge and the faceform and to isolate the accumulator from the vacuum channels within faceform. The JCAST can be adapted to perform a vacuum channel leak test whenever a volumetric flow leak test is being performed on an NBC mask, the JCAST being further adapted to abort the volumetric leak test and display a corresponding message when a leak rate in the vacuum channels is greater than 0.05 sccm.

The JCAST can further include an apparatus adapted to perform the particle counting for the mask integrity testing, the apparatus including a switching valve adapted to switch between an ambient sampling port and a mask sampling port, an alcohol soaked canister adapted to saturate particles received through the ports, a chilled condenser tube adapted to cause alcohol vapor to condense on the particles, a nozzle adapted to focus the particles, a laser light focused on an output of the nozzle and a detector adapted to detect particle concentration by counting flashes produced by the particles interacting with the laser light.

The JCAST being adapted to calculate the leak rate ($L_{DUT}$) for the DUT being determined by a process including calibrating the internal gas plumbing by running a leak test on a standard leak source and recording after one minute calibration leak rate (Lc), ambient temperature ($T_{ac}$), time ($t_c$), accumulator gauge pressure at start of test ($P_{1c}$), accumulator gauge pressure at end of test ($P_{2c}$), calculating $C_{L1}=(P_1-P_2)/(Lc\cdot\Delta t\cdot T_a)$ and $C_{L2}=P_1$, storing $C_{L1}$ and $C_{L2}$, performing leak test for the DUT when current gauge pressure ($P_c$)>accumulator end pressure ($P_2$) and elapsed time ($t_c$)<t, reading and storing start pressure within the accumulator ($P_{1DUT}$) and end pressure within the accumulator ($P_{2DUT}$), temperature $T_{aDUT}$ and elapsed time $t_{DUT}$, calculating $L_{DUT}$ via one of $L_{DUT}=(P_{2DUT}-P_{1DUT})/(\Delta t_{DUT}\cdot T_{aDUT}\cdot C_{L1})$ and $L_{DUT}=(C_{L2}-P_{2DUT})/(\Delta t_{DUT\cdot TaDUT}\cdot C_{L1})$ where and reporting $L_{DUT}$.

According to another aspect of the present invention, there is provided a method of determining a leak rate, including providing internal gas plumbing comprising volumetric leak test plumbing adapted to run a volumetric flow testing leak test, the plumbing comprising a 2.25 psi gas source, at least one accumulator, a low flow regulator adapted to maintain a constant pressure within a leaking, elastic device under test (DUT), the at least one accumulator being arranged between the regulator and the gas source, a port adapted to connect to the elastic DUT, the plumbing being adapted so that the port is arranged on a side of the regulator opposite to that of the at least one accumulator, attaching the elastic DUT to the port, pressurizing the accumulator and the DUT, closing a valve isolating the gas source, holding the DUT at a constant pressure by supplying an air mass from the accumulator to the DUT via the regulator and the port, recording a start and an end pressure within the accumulator and calculating a leak rate for the DUT from the start and the end pressure within the accumulator and an elapsed time. The method can also include calibrating the internal gas plumbing by running a leak test on a standard leak source and recording after one minute calibration leak rate (Lc), ambient temperature ($T_{ac}$), time ($t_c$), accumulator gauge pressure at start of test ($P_{1c}$), accumulator gauge pressure at end of test ($P_{2c}$), calculating $C_{L1}=(P_1-P_2)/(Lc\cdot\Delta t\cdot T_a)$ and $C_{L2}=P_1$, storing $C_{L1}$ and $C_{L2}$, performing leak test for the DUT when current gauge pressure ($P_c$)>accumulator end pressure ($P_2$) and elapsed time ($t_c$)<t by applying a constant pressure to the device under test and sensing and recording a pressure drop within the accumulator, reading and storing start pressure within the accumulator ($P_{1DUT}$) and end pressure within the accumulator ($P_{2DUT}$), temperature $T_{aDUT}$ and elapsed time $t_{DUT}$, calculating $L_{DUT}$ via one of $L_{DUT}=(P_{2DUT}-P_{1DUT})/(\Delta t_{DUT}\cdot T_{aDUT}\cdot C_{L1})$ and $L_{DUT}=(C_{L2}-P_{2DUT})/(\Delta t_{DUT}\cdot T_{aDUT}\cdot C_{L1})$ where and reporting $L_{DUT}$. The method can be achieved by connecting the DUT to said side of the regulator opposite to that of the at least one accumulator and pushing a single button on said JCAST causing the DUT to be pressurized to a constant pressure of +6 IWG for a duration of the test.

According to yet another aspect of the present invention, there is provided an apparatus of measuring a leak rate of an elastic device under test (DUT) that includes a port adapted to allow for the elastic DUT to attach thereto, a 2.25 psi gas source, a low flow regulator adapted to deliver an air mass to the DUT and to keep the DUT at a constant pressure, even when the DUT leaks, at least one accumulator arranged between the regulator and the gas source and adapted to supply air mass to the DUT via the regulator and the port, the at least one accumulator being further adapted to provide a condition where pressure drop within the at least one accumulator and an air mass leakage from the accumulator to the DUT via the regulator have a known relationship and an electrically controlled valve adapted to cut off the gas source from the at least one accumulator, the regulator and the port, the port being on an opposite side of the regulator than the at least one accumulator. The regulator can be adapted to keep the DUT at a constant −6 IWG for a duration of a leak test. The at least one accumulator can have a volume that provides a sufficient span in pressures within the at least one accumulator during a leak test so that a leak having a leak rate of 0.5 sccm within the DUT can be detected and measured accurately.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 10 is a view of the features of the JCAST according to an embodiment of the present invention;

FIG. 11 is a view of the testing capabilities of the JCAST according to an embodiment of the present invention; and FIG. 12 is a view of the specifications of the JCAST according to an embodiment of the present invention.

DETAILED DESCRIPTION OF THE INVENTION

Figure 1:
FIG. 1 is a view of the JCAST according to an embodiment of the present invention.

Turning now to the figures, FIG. 1 is a view of the novel JCAST 1000 according to an embodiment of the present invention. As illustrated in FIG. 1, the case for the JCAST is opened so that the control panel can be seen.

Figure 2:
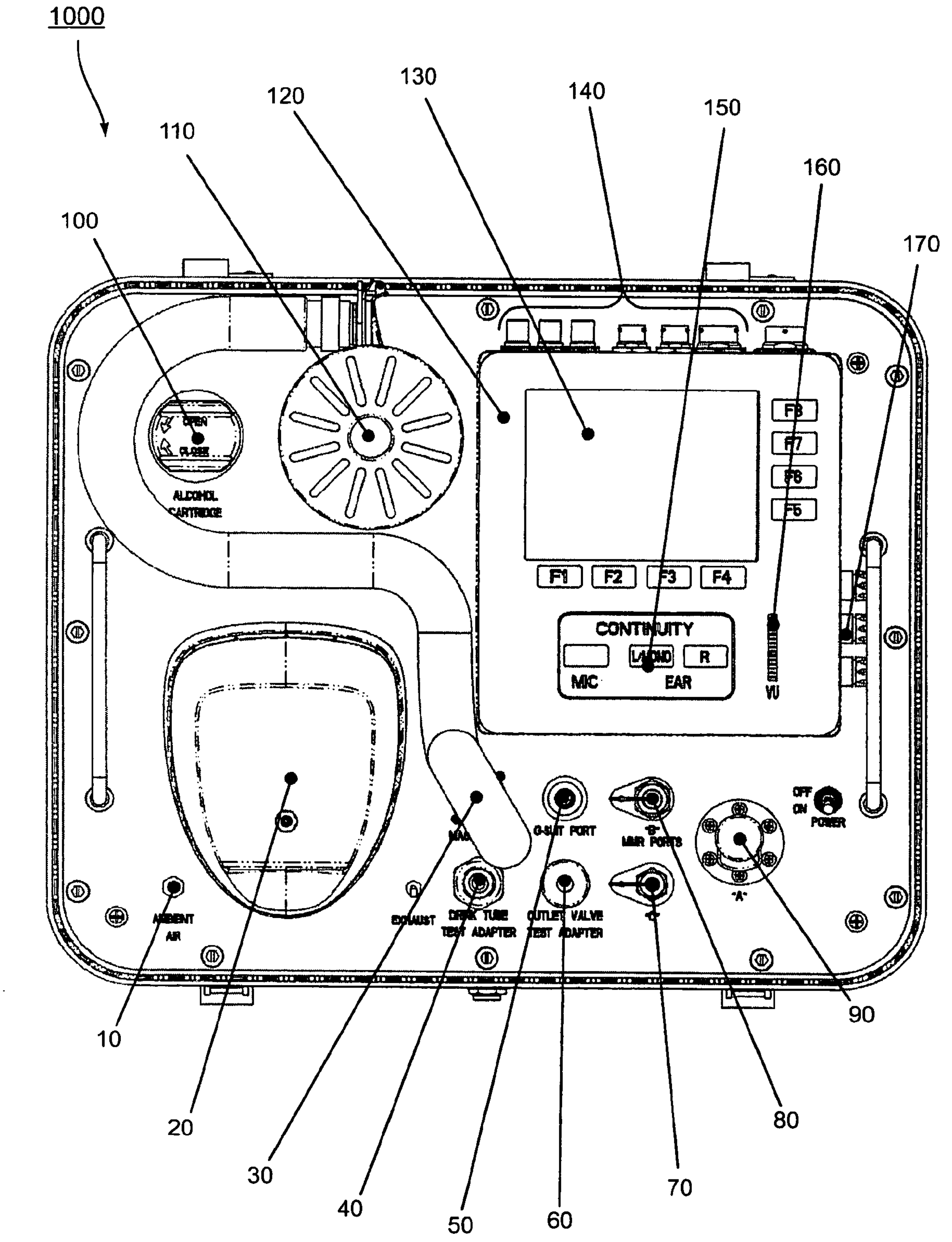
FIG. 2 is a view of the control panel of the novel JCAST according to an embodiment of the present invention.

Turning now to FIG. 2, FIG. 2 is a view of the control panel for the JCAST 1000 according to an embodiment of the present invention. As illustrated in FIG. 2, the control panel contains ambient air sample port 10, removable head form 20, mask port/mask tube 30, drink tube adapter 40, G-suit port 50, outlet valve port adapter 60, MMR port Air Force (AF) variant 70, MMR port Navy variant 80, MMR port Navy variant with integrated Comm 90, alcohol cartridge 100, C2 (chemical) filter 110, flat panel 120, LCD display 130, audio test ports 140, GO/NO GO continuity lamps 150, analog VU meter 160 and fuses 170. As can be seen in FIG. 2, the various ports are all integrated into one compact JCAST unit.

Figure 3:
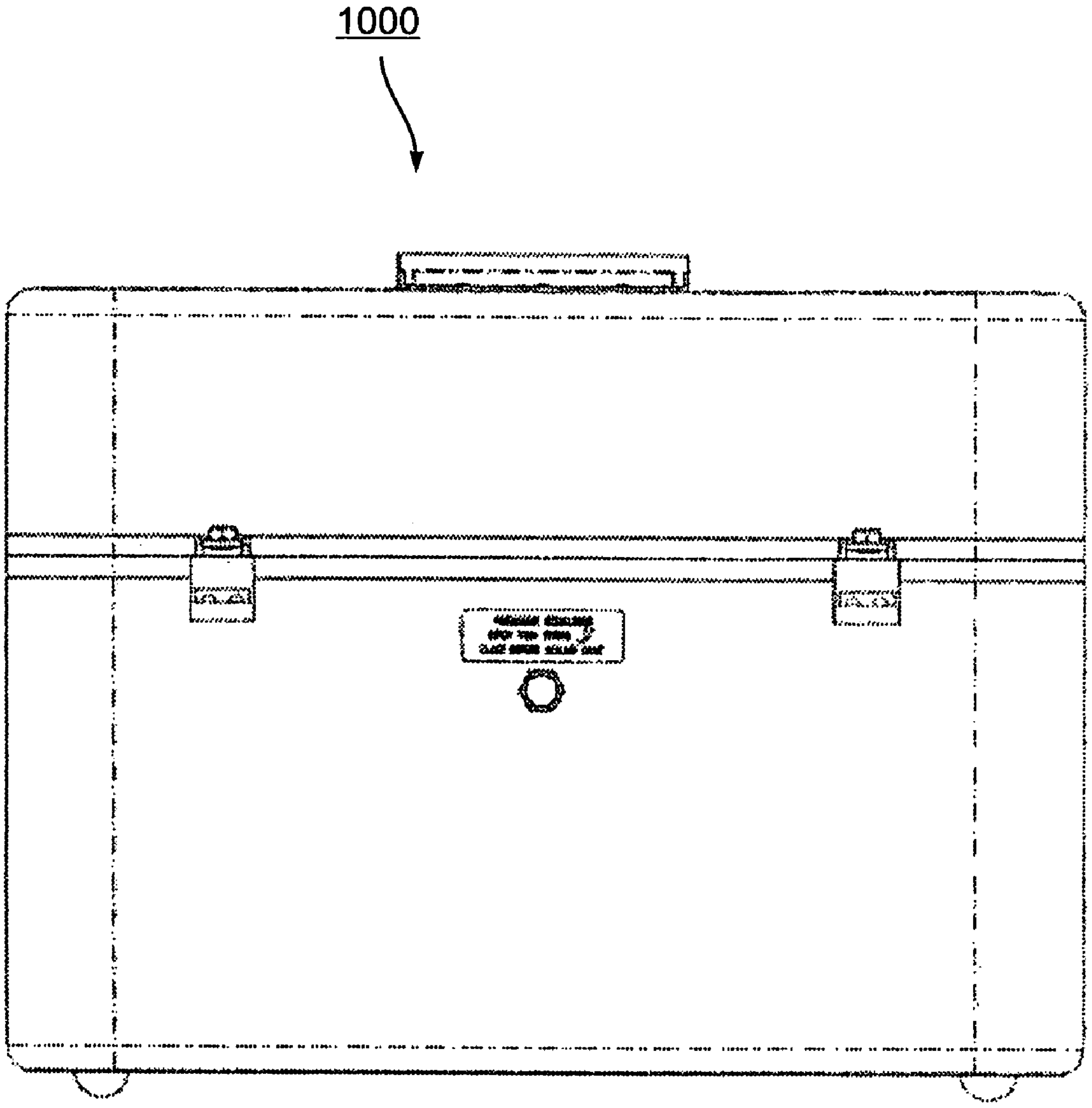
FIG. 3 is a front view of the case of the JCAST according to an embodiment of the present invention.
Figure 4:
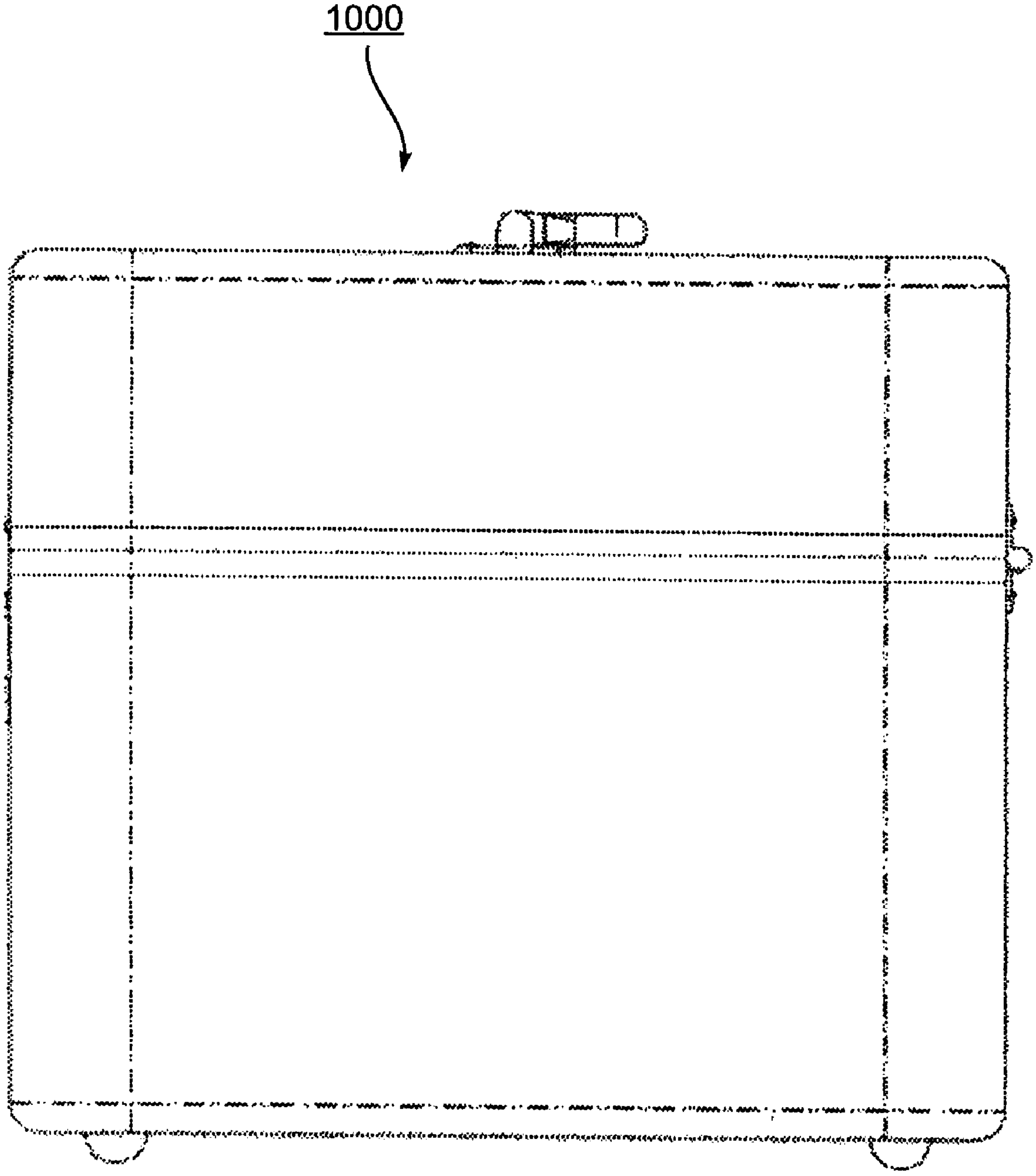
FIG. 4 is a side view of the case of the JCAST according to an embodiment of the present invention.

Turning now to FIGS. 3 and 4, FIGS. 3 and 4 are front and side views respectively of the case for the JCAST 1000 according to the present invention. As seen in FIGS. 3 and 4, the case has a removable hinged cover.

The main novel features of the present invention are that the JCAST, unlike earlier CASTs, is able to 1) perform chemical and biological seal and leak testing for JSAM mask variants, and 2) provide higher air pressure needed to perform testing of MMRs for each of the joint services. Both leak tests and particle count tests for fit and integrity of chemical and biological masks can be performed using a small, portable device, these tests being performed automatically.

Figure 5:
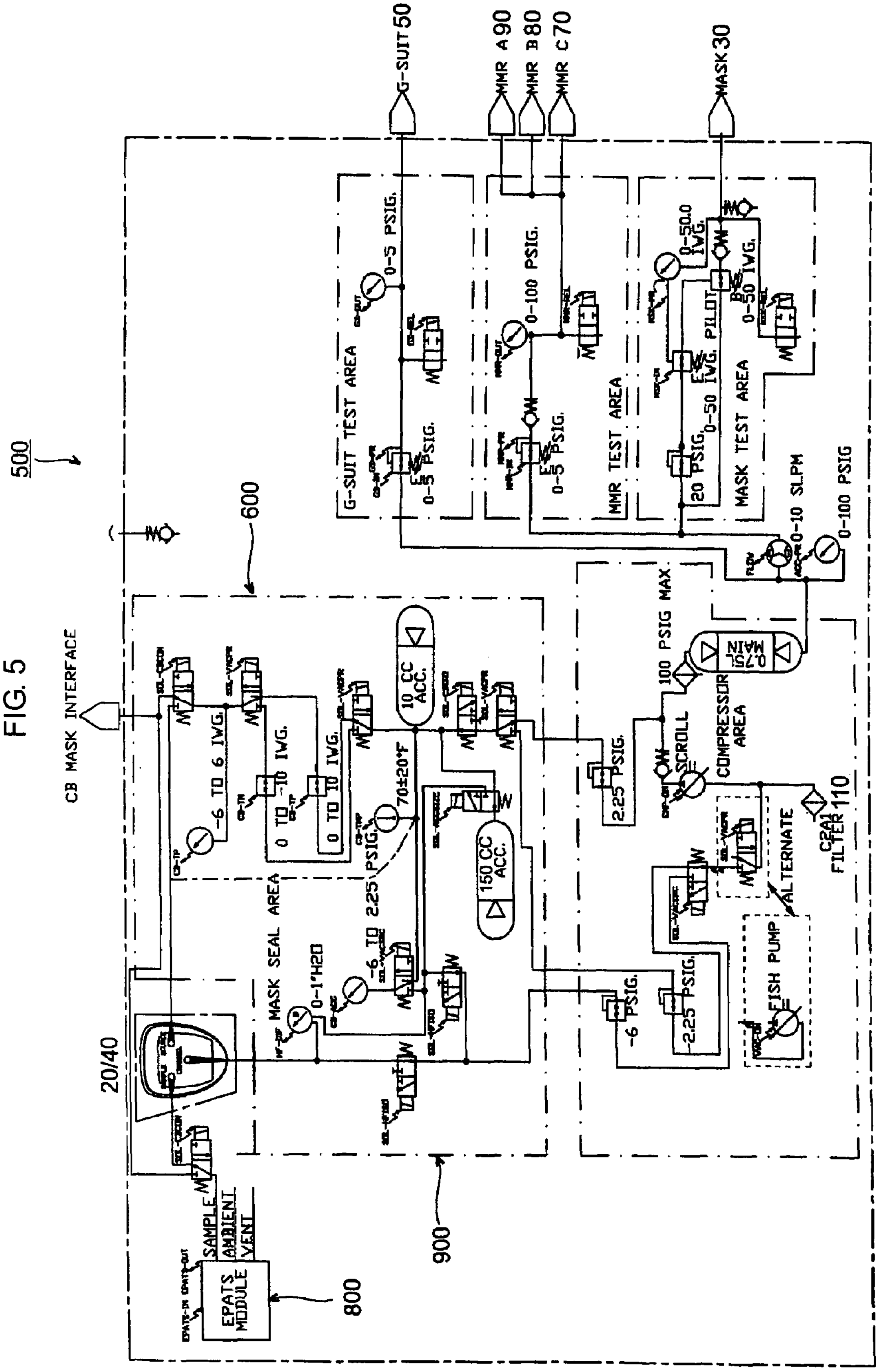
FIG. 5 is a view of the internal plumbing of the JCAST according to an embodiment of the present invention.
Figure 6:
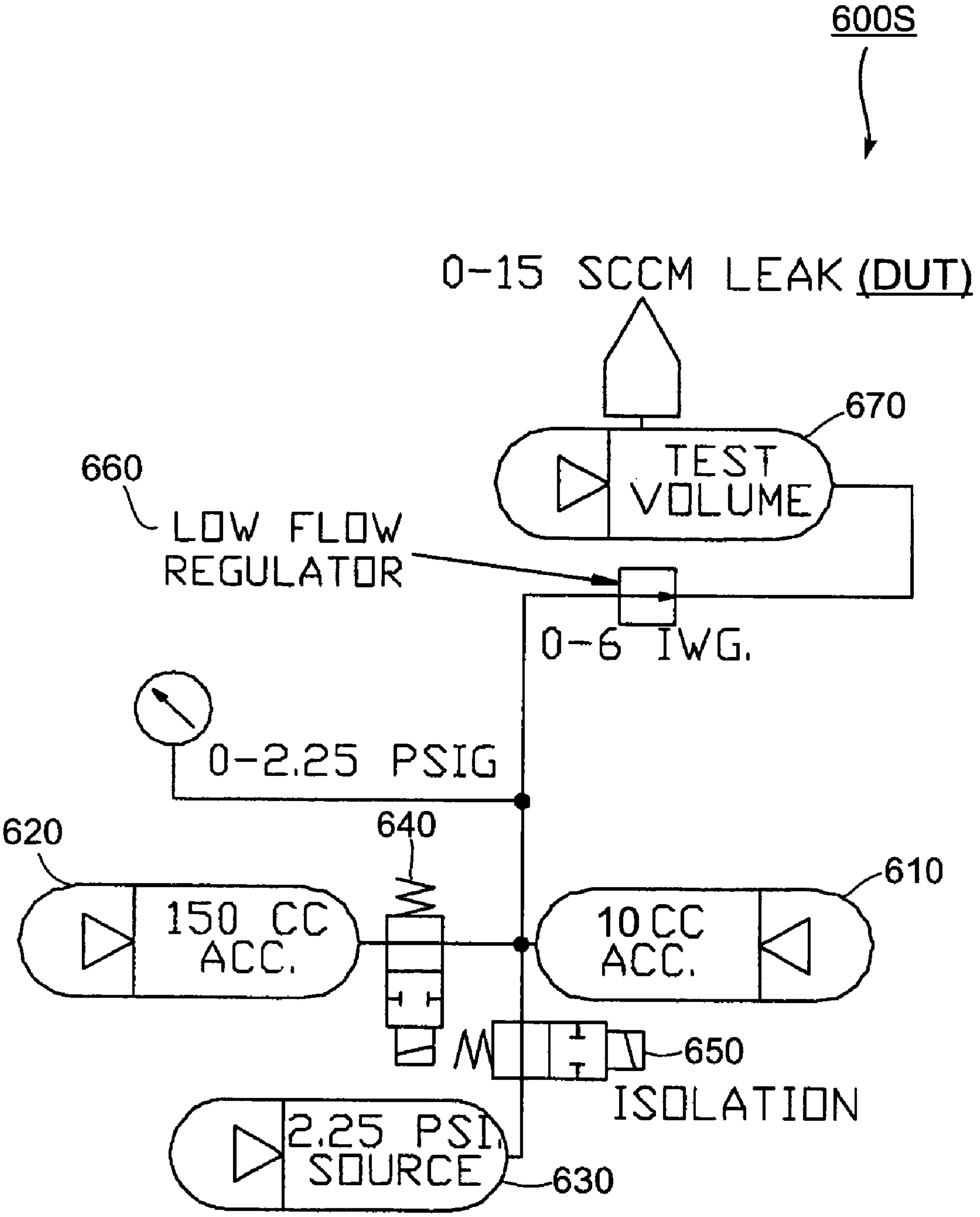
FIG. 6 is a view of a simplified version of a portion of the internal plumbing of FIG. 5 that performs leak tests of elastic bodies.
Figure 7:
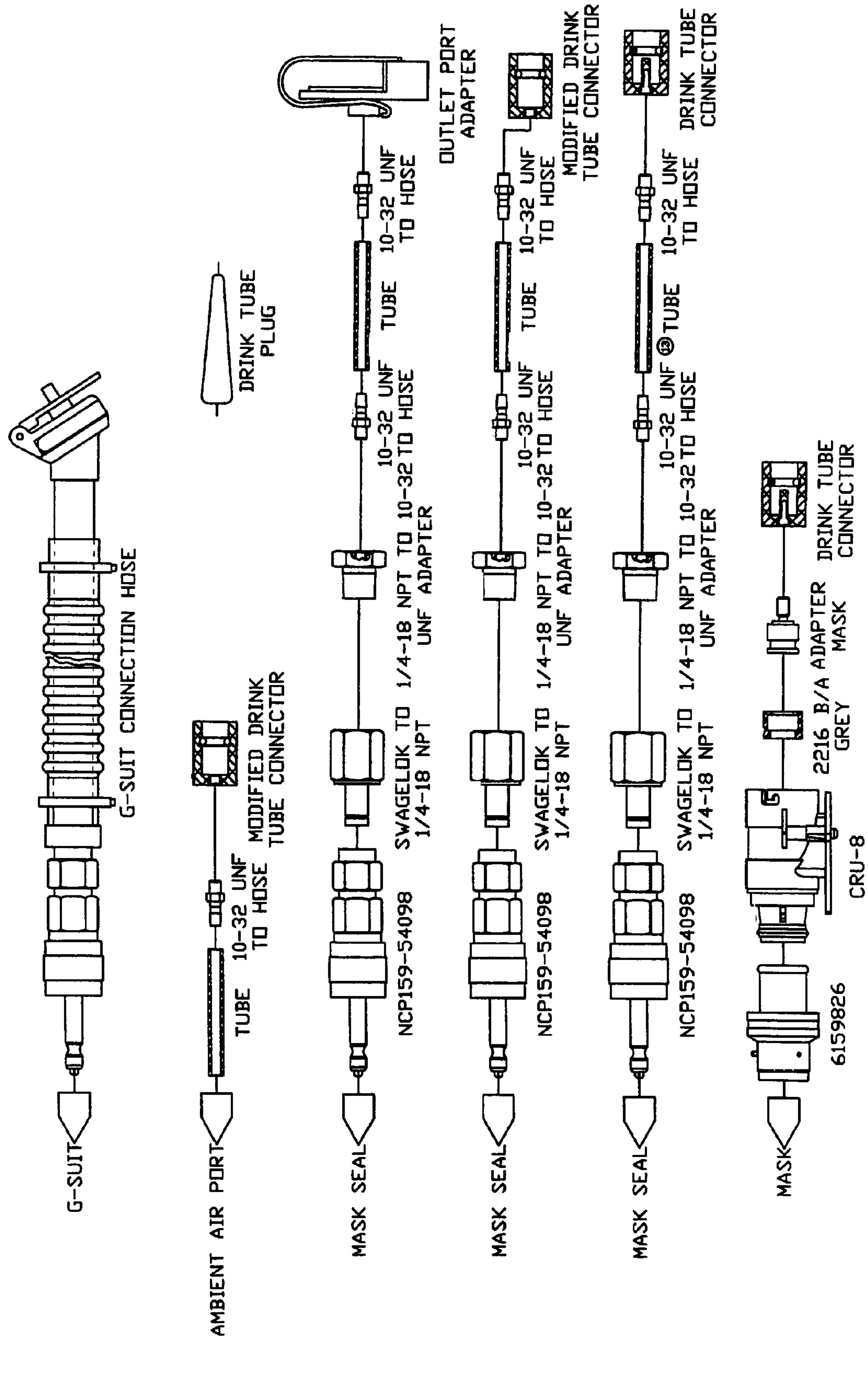
FIG. 7 is a view of adapters that connect to ports of the JCAST of the present invention.
Figure 8:
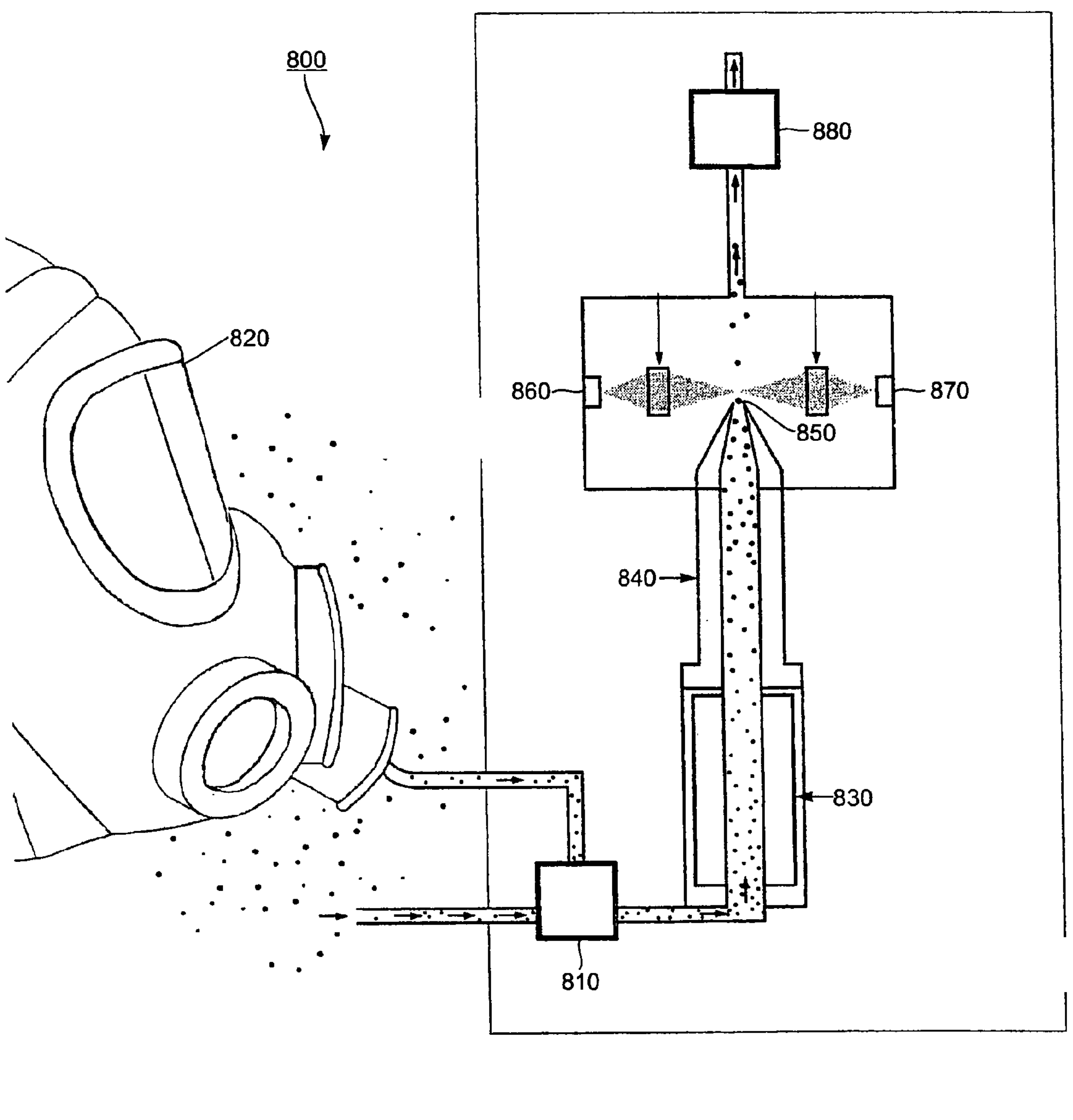
FIG. 8 is a view of a particle counting apparatus used in the JCAST of the present invention.
Figure 9:
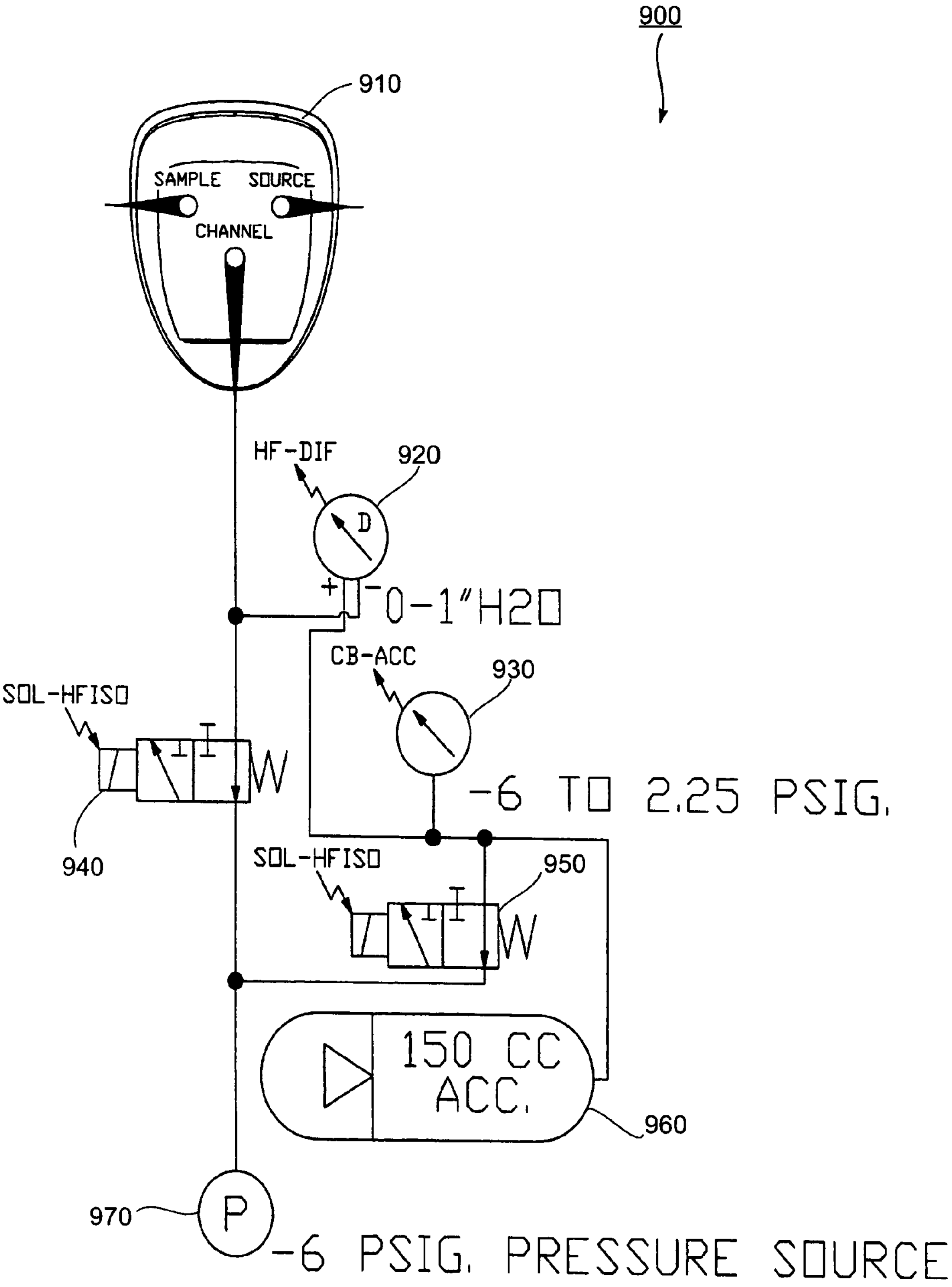
FIG. 9 is a view of a portion of the internal plumbing of FIG. 5 used to perform a vacuum channel leak test.

Referring now to FIGS. 5 through 9, FIG. 5 is a schematic diagram of the internal plumbing 500 of the JCAST 1000, FIG. 6 is a simplified version of a blown up portion of the upper central portion of the plumbing 500 of FIG. 5 showing a simplified version of the novel Volumetric Leak Test Definition, FIG. 7 is a figure of the adapters used to connect to the JCAST 1000 of the present invention, FIG. 8 is a view of an upper left corner of FIG. 5 showing an apparatus used to perform particle counting leak tests used in the JCAST 1000 of the present invention and FIG. 9 is a view of an upper left portion of the plumbing 500 of FIG. 5 showing the apparatus used to perform a vacuum channel leak test of the faceform. As illustrated in FIG. 5, the internal plumbing 500 connects with various ports on the JCAST 1000 of FIG. 2. The volumetric leak test plumbing portion 600 of FIG. 5 properly shows that the volumetric leak test definition plumbing 600 can be performed either as a pressure test at +6 IWG or as evacuated test at −6 IWG. FIG. 6 is a view of a simplified version **600*s* of the volumetric leak test definition plumbing 600 of FIG. 5** in that it shows only the plumbing for the pressurized version of the volumetric leak test definition and omits the portion of the plumbing used for the evacuated version of the volumetric leak test definition. This was done merely to simplify the explanation as to how the volumetric leak test is performed.

The JCAST 1000 of the present invention includes the plumbing 500 of FIG. 5 into one integrated, compact, portable and lightweight unit 1000. Together, the plumbing 500 of FIG. 5 (including the detailed plumbing of FIGS. 6, 8 and 9) can perform a wide range of tests on a wide range of elastic items. JCAST 1000 has 3 types of testing techniques for testing elastic bodies that are organized in a way that is transparent to the user. The user selects what they would like to test and JCAST determines the technique it will use to perform the test and prompts the user to set up the test appropriately. Below is Table 1 showing how the JCAST performs various tests:

TABLE 1

| User Selected Test | Test Technique |
|---|---|
| Quantitative Fit Factor | Particle Count Testing |
| Mask Integrity | Particle Count Testing or Volumetric Flow Testing (either evacuated or pressurized) |
| Drink Train Integrity | Volumetric Flow Testing (either evacuated or pressurized) |
| Drink Tube Seat | Volumetric Flow Testing (either evacuated or pressurized) |
| Drink Tube Restriction | Flow Restriction testing |
| Outlet Valve Seat | Volumetric Flow Testing (pressurized only) |

The following is an explanation of how JCAST will perform each of the tests listed above in Table 1 in conjunction with FIGS. 5, 6, 8 and 9:

Volumetric Flow Testing: Elastic items such as drink tubes, and nuclear, biological and chemical masks (hereinafter NBC masks) need to be checked for leaks to ensure that the user of the masks in the field is afforded proper protection. Traditional techniques such as pressurizing the item or device under test (DUT) and monitoring a decay in pressure within the DUT over time due to the leak are insufficient because 1) such traditional approaches are insufficient to detect very small leaks and very small pressures and 2) the traditional leak detection techniques have the DUT undergo pressure drop during the course of the test thereby compromising leak rate calculations, especially when the DUT is elastic. Military authorities require that NBC masks have less than 0.5 sccm leakage at +/−6 IWG. Traditional techniques of measuring leak rates where pressure decays within the DUT are entirely inadequate to detect and measure leaks having such leak rates under such conditions of +/−6 IWG for an elastic DUT. And with elastic bodies, if a traditional pressure decay technique is used, inaccurate results are apt to occur due to the fact that the pressure within the DUT varies during the duration of the test. Therefore, what is needed is an apparatus and a technique of accurately measuring such minute leaks (i.e., 0.5 sccm at +/−6 IWG) in elastic DUTs. Further, what is also needed is an apparatus that can easily be modified to measure leak rates of various DUTs of various sizes and having various thresholds of leak rate tolerances. This can be accomplished with the apparatus and technique of volumetric flow testing of the present invention.

In volumetric flow testing, the DUT is held at a constant pressure throughout the duration of the test, that the integrity of the measured and calculated leak rate can be more accurate. Further, the test is performed either when the DUT is pressurized to +6 IWG or evacuated to −6 IWG. The volumetric leak test definition of FIGS. 5 and 6 are used to perform the test and a novel technique is used to then calculate the leak rate from data acquired during the test. The leak rate calculation technique will be discussed later.

Turning now to FIG. 6 and the simplified plumbing diagram used to perform the volumetric leak test, the plumbing diagram 600*s* for the simplified volumetric leak test includes a small accumulator 610 and a large accumulator 620. A pressurized gas source 630 provides gas to the accumulators when the solenoids 640 and 650 are opened. Solenoid 640 merely serves to allow for the removal and installation of accumulators so that another size accumulator can be easily connected. Solenoid 650 and not solenoid 640 is actually operated during the leak test. A low flow regulator 660 serves to keep a leaking device under test (DUT) 670 at a constant pressure throughout the duration of the test by replacing leaked air with air from accumulators 610/620. The presence of the two accumulators provides for multiple leak test ranges for a single system. The DUT 670 can be an elastic object, such as a chemical, biological or nuclear mask or a drink tube.

There are two ranges of this leak tester which are selected by JCAST depending the DUT. The range for drink tube tests is in the low range (nominally 0.5 sccm with DUT @+/−6 IWG). If testing a mask outlet valve seal, JCAST will test in the high range (nominally 12 or 15 sccm with DUT @+/−1 or 2 IWG) (See Table 2 below). The range is internally selected by the JCAST by selecting the accumulator volume, as in the plumbing diagram 600*s*. A very small accumulator (ACC) 610 and/or 620 feeds a specially designed low flow regulator 660. A pressure decay occurs in the small accumulator 610 and/or 620.

The leak test is automated. The test will run to completion without user intervention, unlike the CAST. Depending on the device under test (DUT), JCAST will prompt the user to connect the device to the appropriate port using the appropriate adapter fittings shown in FIG. 7. A single keystroke (i.e., pressing the "Test" soft key) will then start the test. This causes the 2.25 psig source 630 to be turned on. Then, the accumulator size is adjusted by opening or closing a valve 640 mechanically in line with the larger accumulator 620. If valve 640 is open, the total accumulator size is the sum of accumulators 610 and 620. The low flow regulator 660 is set to the test pressure shown in Table 2 below based on the DUT and keeps the pressure within DUT 670 constant throughout the test, even when DUT leaks. During the test, isolation valve 650 is closed separating source 630 from the accumulators 610, 620, regulator 660 and the DUT 670.

Below in Table 2 are the test parameters for various DUTs used in the volumetric leak test:

TABLE 2

| DUT | Leak Rate | Test Pressure | Estimated Test Volume At Pressure (including tubing) | Accumulator Volume |
|---|---|---|---|---|
| 1. Entire Drink Train of NBC Mask | 0.5 sccm | 6" $H_2O$ | 15 cc | 10 cc |
| 2. The Drink Tube's Valve (if Seated Properly) | 0.5 sccm | 6" $H_2O$ | 18 cc | 10 cc |
| 3. Outlet Valve of NBC Mask | 15 sccm | 1" $H_2O$ | 15 cc | 160 cc |
| 4. Entire NBC Mask on a Head Form | 0.5 sccm | 6" $H_2O$ | 615 cc | 10 cc |

These test parameters of Table 2 dictate the size of the accumulators 610/620 used and the pressure that the regulator 660 will keep the DUT 670 at for the duration of the test. The accumulator size and the test pressure are dictated by the type of DUT as indicated in Table 2.

During this testing process, the JCAST performs the test automatically. The JCAST is programmed to begin the test only after the JCAST determines that the port pressure is within a given range and has stabilized. If the pressure does not reach the required start pressure, JCAST will return a fail condition.

When isolation valve 650 closes and the leak test begins, the following occurs. The start pressure inside accumulator 620 or 610 is recorded ($P_1$). Also, time elapsed ($t_c$) is kept track of. As time elapses, air may leak from DUT 670. Regulator 660 allows air from the accumulators 610 and/or 620 to replenish DUT 670 so that DUT 670 always remains at a constant pressure. Because valve 650 is closed, source 630 is cut off and air mass used to replace air leaked from DUT 670 must come from the accumulators 610 and/or 620. As a result, pressure within the accumulators 610 and/or 620 drops because of the leak in DUT. At the end of the test, the end pressure $P_2$ and the elapsed time $t_c$ are recorded and are used to calculate the leak rate for the DUT. It is from this pressure decay ($\Delta P$) within the accumulators 610 and/or 620 that the leak rate L of the DUT 670 can be determined.

It is to be appreciated that throughout the test, DUT 670 is always held at a constant pressure by regulator 660, even when DUT 670 leaks. The accumulators 610 and 620 serve to provide the air mass needed to keep DUT 670 at constant pressure for the duration of the test. Further, the accumulators 610 and/or 620 also serve as a place to measure a pressure drop due to the leak in DUT 670. By knowing the pressure drop ($\Delta P$)within the accumulators, the time elapsed ($t_c$), and the accumulator size, the leak rate of the DUT can be calculated.

It is to be appreciated that it is the pressure drop ($\Delta P$) within the accumulators 610/620 and not in the DUT 670 that will ultimately will be used to calculate the leak rate ($L_{DUT}$) of the DUT. The present invention provides further accuracy in measuring minute leak rates at minute pressure differentials because the span of the start pressure to end pressure ($\Delta P$) within the accumulators can be controlled choosing an appropriate accumulator size and start pressure. If you make this span ($\Delta P$) of pressure within the accumulator larger, you will obtain better accuracy in figuring out the leak rate ($L_{DUT}$) of the DUT. Therefore, the present invention allows a variety of DUTs to be tested with easy modification by changing the size of the accumulators used.

The technique of measuring a leak rate $L_{DUT}$ for a device under test (DUT) is as follows. Initially, a calibration is performed on a standardized leak source. Recorded are the one minute calibration leak rate (Lc), ambient temperature ($T_a$), time (t), accumulator gauge pressure at start of test ($P_1$), accumulator gauge pressure at end of test ($P_2$) where $\Delta P = P_1 - P_2$. $C_{L1}$ and $CL_{L2}$ are calculated via $C_{L1} = (P_1 - P_2)/(Lc \cdot \Delta t \cdot T_a)$ and $C_{L2} = P_1$. Then, the values of $C_{L1}$ and $C_{L2}$ are stored. Then, the DUT is connected to the testing apparatus. The leak test for the DUT is performed when current gauge pressure $P_c$ is less than $P_2((P_c) > P_2)$ and elapsed time $(t_c) < t$. During the test of the DUT, $P_2$ (or pressure drop during test ($\Delta P$)), $T_a$ and t are read and stored. Following this, the leak rate $L_{DUT}$ can be calculated from one of the two following equations $L_{DUT} = \Delta P/(\Delta t \cdot T \cdot C_{L1})$ and $L_{DUT} = (C_{L2} - P_2)/(\Delta t \cdot T \cdot C_{L1})$. These formulae were derived by the inventors from the ideal gas law PV=nRT as well as the inventor's appreciation that there is a known relationship between the pressure drop in an accumulator and amount of air mass leakage. Upon calculation of $L_{DUT}$, the $L_{DUT}$ can be reported. The reading, storing and calculating of the leak rate are fully automated in the JCAST of the present invention.

The above is a discussion of the pressurized version of the volumetric leak test where the DUT 670 is held at a slightly higher pressure than atmosphere for the duration of the test. The JCAST of the present invention can also perform the volumetric leak test for a evacuated version where instead the DUT is held at a slightly lower pressure than atmosphere and air leaks in from the atmosphere into the DUT during the test. Section 600 of plumbing 500 of FIG. 5 shows the plumbing diagram 600 used to perform both the pressurized version and the evacuated version of the volumetric leak test for elastic DUTs. Unlike the simplified plumbing 600*s* of FIG. 6, the actual plumbing 600 of FIG. 5 has an extra regulator used for the evacuated version of the leak test and extra solenoid valves used to switch between the two regulators depending on whether the evacuated version or the pressurized version of the volumetric leak test is performed. In the evacuated version of the volumetric leak test, the accumulators are held at a lower pressure than atmosphere, and rise in pressure during a leak test. Air flows from the DUT through a regulator and into the accumulators during the test. Techniques of calculation of leak rate are similar to that previously described.

Particle Count Testing: The JCAST of the present invention allows for chemical and biological testing of masks for leaks via particle counting. The JCAST of the present invention performs these tests via ambient air particles instead of using an aerosol generation technique (see Particle Count Testing below). None of this chemical mask testing was present on the CAST tester.

JCAST uses a particle counter to conduct this testing and its apparatus is similar to that found in the Joint Service Mask Leakage Tester (JSMLT), mfg: ATI, Model/N. TDA-99. An explanation of the particle counting technology and determination of Quantitative Fit Factor (QFF) used in the JCAST can be found is similar to that of the M41 made by TSI, Inc and can be viewed at: http://www.tsi.com/uploadedFiles/Product Information/Literature/Manuals/1980132j.pdf. An illustration of the particle counter 800 used in the JCAST 1000 of the present invention can be found in FIG. 8 and is a blow up of the portion of FIG. 5 labeled "EPATS module".

Particle counter 800 of FIG. 8 works by the principle that benign dust particles are released into the ambient air surrounding mask 820. This is an improvement over other fit tests and integrity tests as the dust particles, unlike aerosols or the like, are not apt to severely affect a human test subject. If there is a leak in the mask and/or if there is an imperfect seal between the mask 820 and the headform, some of the dust will enter into the mask. Switching valve 810 switches from ambient outside air to air within the mask 820 so that the concentration of the dust outside the mask can be compared to the concentration of dust inside the mask in order to determine a leak rate.

When dust is drawn into the device 800, it first enters into an alcohol soaked cylinder 830 where the dust becomes saturated with the alcohol. The saturated dust enters a condenser 840 where it is chilled and condensed. The condensed dust emerges at a nozzle 850 where it is illuminated by laser light from a source 860. A detector 870 counts the number of dust particles thus leading to a determination of the concentration of dust. Pump 880 then pumps out the dust particles out of the apparatus 800. For particle counting tests, the JCAST screen 130 states what the exercise is that should be done during the test, and also states what the results are. The particle counting apparatus 800 of FIG. 8 is within the JCAST 1000 chassis so that either particle counting or volumetric testing can be used to determine leak rates from a single, light weight, portable, compact apparatus 1000.

Flow Restriction testing: This is the simplest of all the types of chem mask testing. Again, JCAST prompts the user to connect the proper adapter fittings to the proper port, in this case the mask port. Air pressure is applied to the port, the air flow is measured (with a mass air flow transducer, 0-10 SLPM). The pressure and flow must be within a certain range for a PASS condition to occur. Under certain conditions, JCAST knows that test conditions are not correct, such as when the pressure is too low and when the flow was too low. This would lead to an inconclusive result. The tester may conclude that nothing is connected to the port in such a scenario.

Further Discussion of Mask Integrity Tests and the Vacuum Channel Leak Test

In the case of MASK INTEGRITY, the mask is placed on a faceform rather than on a human's face and particle count testing or volumetric leak testing is then performed. Using the faceform limits failures to every possible location for leakage other than the mask to face interface. The mask is held to the faceform by means of a vacuum channel that resides on the faceform. The acceptance test procedure (ATP) for the JSAM is performed using a faceform with a vacuum channel. For JSAM, the head form and the vacuum channel can be similar to those produced by AVOX systems (formerly Scott Aviation). JCAST 1000 of the present invention is similar to this ATP. This is distinguished over strapping the mask in with bayonet connections and inflating a bladder on the faceform to achieve a seal as in the JSMLT.

During the Mask Integrity testing, JCAST pulls vacuum from the vacuum channel in an attempt to seal the mask to the human interface seal on the faceform. JCAST utilizes a vacuum transducer 900 of FIG. 9 downstream of the vacuum channel to determine if the mask is properly sealed against the faceform and thus minimal leaking is occurring. On the screen of the JCAST, a bar graph is displayed which represents this vacuum measurement. More vacuum corresponds to how tight of a seal the mask has with the faceform. Hence, the bar graph is labeled on two extremes "good seal" and "bad seal". The particle count test or volumetric leak test of the mask will not be conducted until a "good seal" is achieved, or in other words, when proper vacuum is present in the vacuum channel. Generally, the criteria for this is that the mask to faceform interface must have a leak rate of no more than 10% of the maximum allowed leak rate for the mask. Since masks are allowed a maximum leak rate of 0.5 sccm, the mast to faceform seal must have a leak rate of mo more than 0.05 sccm in order for the JCAST 1000 to proceed with the leak test. If vacuum is ever lost during a test, the test will abort and the JCAST will state the condition that has occurred and request that the mask be sealed again. Mask pressure is will be regulated at −6 IWG (inches of water, gauge) (vacuum) for this test to simulate a worst case scenario.

The mask integrity test can be a particle count test just like QFF except that, because a person is not actually wearing the mask, there are no exercises associated with the test. Unlike the QFF test, there is only one iteration of ambient air sampling and mask air sampling. There are no exercises necessary because a human is not wearing the mask. Because of this, the test result is the inverse of the Fit Factor and is typically called "percent leakage". This number is stated at the end of testing.

Mask Integrity is leakage test of a nuclear, biological, chemical (NBC) masks that isolates leakage at every location of an NBC mask other than that of the mask to face interface. This test is not possible to perform while on a human subject due to flow through a human face surface. The NBC mask is interfaced with a prosthetic headform so that a closed system is created and a leakage test can be performed. There are two major ways of performing leakage testing on an NBC mask that requires leak detection of about 0.5 sccm, particle count testing (or aerosol testing) and volumetric leakage testing. These two techniques of performing a leakage test on a leaking container have been discussed previously.

Prior to performing either of the leakage tests described herein, a mask to headform seal must be established. Furthermore, to ensure an accurate test is performed, it is required that this seal be verified. The concept of establishing the mask to headform seal discussed herein is similar to that of AVOX systems but with some novel differences.

To establish a seal between the NBC mask and the headform, a vacuum is generated between the sealing surface of the mask and the sealing surface of the headform. This is accomplished by the design of the headform. The headform has a hollow trough or channel that is located at the sealing surface of the headform. The vacuum channel is evacuated to between −6 PSIG and −10 PSIG to establish a good seal.

This technique presents the opportunity for the mask to headform seal to be checked for integrity via a leakage check. In fact, this channel must be checked for leaks to avoid the possibility of a leak from the vacuum channel to the inside area of the mask. There is the potential for flow from the inside of the mask due to a pressure differential between the inside area of the mask and the vacuum channel. If the mask to faceform seal is poor and significant air is leaking into the vacuum channel, then the calculated leak rate determined via either the volumetric leak test or the particle counting test will not be valid as a substantial portion of the calculated leak rate is due to the mask to faceform seal and not to any defect in the mask itself. The JCAST is programmed not to continue with a leak test until it can be verified that the mask to faceform interface is satisfactory.

The inside area of the mask will be checked for leaks after the mask to headform seal has been established, therefore any flow from the inside of the mask to the vacuum channel will effect the mask integrity leakage test. For example, if there is ambient air leakage to the vacuum channel of 0.25 sccm, there can be anywhere between 0 and 0.25 sccm of air originating from inside the mask. So, worse case, this will result in 0.25 sccm leakage when performing a volumetric leakage test of the mask.

To guarantee a good seal is obtained, the air passages that supply vacuum to the vacuum channel are checked for air flow. Any air flow from the channel represents an air leak from outside the vacuum channel system. Because a leak at the channel can skew the results of the leakage test for mask integrity described above and decrease the accuracy of test, a leakage test of the vacuum channel for a leak an order of magnitude less than that of the volumetric leakage test of the mask must be verified. For example if the pass/fail threshold of an NBC mask is 0.5 sccm, the vacuum channel must be checked for a pass/fail leakage threshold of 0.05 sccm by what is called a vacuum channel leak test. If the JCAST determines that the leak rate of the vacuum channel is in excess of 0.05 sccm, the JCAST will not proceed with the leak test.

Since keeping the headform vacuum channel at a constant absolute pressure is not required, the volumetric leakage test that we describe above is not required in determining if the headform/mask seal is satisfactory for the volumetric mask integrity leak test. Instead, a leakage test that requires less pneumatic components can be used to perform the vacuum channel leak test. With this technique, an accumulator is pressurized along with the vacuum channel. A transducer then reads the difference in pressure between the accumulator and the vacuum channel over time. Calculations convert this change in pressure difference over time into a leak rate for the vacuum channel. Algorithms convert this difference into a volumetric measure of the leakage rate. Such an apparatus 900 used to conduct this vacuum channel leak test is shown in FIG. 9.

Before performing a volumetric leak test of an NBC mask, the integrity of the seal using the apparatus 900 of FIG. 9 must first be verified. If the leak rate of the seal using the apparatus 900 of FIG. 9 is more than 10% of the threshold of the mask integrity leak rate, the leak rate of the mask integrity using the apparatus of FIG. 6 is severely compromised and can not be used. Because the volumetric leak test tests for minute leaks having minute leak rates, and because the leak rate of the mask to faceform seal must be less than 10% of the mask integrity leak rate, the apparatus 900 of FIG. 9 must be designed to test for very small leaks as small as 0.05 sccm, making the apparatus 900 of FIG. 9 novel.

As illustrated in FIG. 9, apparatus 900 for the vacuum channel leak test includes a vacuum channel in a face form 910, a minute (1 IWG) pressure differential sensor 920, a pressure sensor 930, electrically controlled valves 940 and 950, a small (150 cc) accumulator 960 and a pressure source 970 (−6 PSIG). At first, the test mask is placed in the headform 910. Valves 940 and 950 are opened to allow pressure source 970 (actually a vacuum source) to remove air so that the test mask can form a seal to the headform 910 and so that accumulator 960 can be appropriately pressurized (actually vacated). At the start of the test, both valves 940 and 950 are closed cutting off source 970 and separating the accumulator 960 from the vacuum channel in head form 910. Then, minute differential gauge 920 measures the pressure difference between the vacuum channels in the headform 910 and the accumulator 960. Any defects in the vacuum channel or in the seal of the mask on the headform 910 will result in air coming into the vacuum channel and being registered on differential gauge 920. By monitoring gauge 920 over time, the leak rate of the vacuum channel and the seal thereon can be determined.

Apparatus 900 is superior in that it can detect minute leaks in the vacuum channel and in the seal between the mask and the faceform 910. Instead of using a flow meter to determine leak rate, pressure differences between the original pressure at the start of the test and a current pressure in the vacuum channel at the end of the test can provide more a accurate determination of the leak rate for minute leaks. By having the range of differential pressure gauge 920 very small (1 inch water) and by having the size of the accumulator 960 very small (150 cc), apparatus 900 can be very sensitive to very small leaks which makes it superior for the present application in that it can accurately measure leaks as small as 0.05 sccm in the vacuum channel.

By providing an apparatus and technique for testing the integrity of the mask to faceform seal, a more accurate result can then be achieved in measuring the leak rate of NBC masks at the 0.5 sccm range. In addition to holding the pressure in the DUT constant throughout the test, using an appropriate accumulator size, by ruling out errors in the human to mask interface and errors in the faceform to mask interface, the present invention can provide accuracy and confidence in determining the leak rate of NBC masks for mask integrity.

MMR Testing

In addition to performing the above tests on the above elastic items, the JCAST of the present invention has many other features. For example, the JCAST of the present invention can deliver air for breathing from a Man Mounted Regulator (MMR) for a period of time to provide for sustained breathing from MMRs (beyond 1 minute). Pressure decay testing of MMRs is also feasible. In addition to the above, the JCAST of the present invention has automated, expanded, and made more user friendly functions of the CAST tester.

A new compression system is what makes the JCAST capable of supplying higher pressure air than the CAST. The air is compressed and fed into a reservoir similar to that of a normal commercial air compressor. The air supplied to the mask, MMR, and G-suit ports are all regulated down to an appropriate level. The compressed air is oil free.

For "low power" operation or battery operation, the hardware is operated differently than in 120/220 VAC power mode. The head pressure is not maintained at 100 psig if not required. For example, if a certain test requires 32 IWG and the regulator supplying the air only needs a supply of 5 psig to do that operation, max head pressure is not run. Not having to compress air against a head of 100 psig saves battery power. This would not be the case when running on 120 VAC power, as high head pressure is maintained because if the user switched quickly to a test that requires a head of 100 psig, there is a better chance of being charged and ready to go. This is one way to save power.

Audio Testing

Additional audio testing can also be performed. The JCAST according to the present invention includes sonar headset testing capability. In the JCAST according to the present invention, the circuit is now capable of testing stereo headsets. Included is tone testing so headset earphone elements can be tested without the microphone (MIC) element (for fault isolation). Headset cables with internal transformers can be tested. Amplified MICS can be tested with the traditional listen/talk audio test current measurement to see if the MIC is drawing the correct amount of current. Electret MICs can also be tested as the JCAST can measure the current drawn by such MICs. Continuity testing can now be done over 0-2000 ohm range. Continuity testing hardware is programmable so that new mic/earphone elements can be programmed into the JCAST.

Unlike the CAST, the JCAST of the present invention achieves audio testing by selecting types of headsets or aircraft. The JCAST will then determine what MIC and earphone elements are present based on that information. This is much more user friendly as the mic/earphone element impedances do not have to be known to the user. Nevertheless, JCAST still allows the mic/ear elements to be manually chosen.

Display Screen

One unique feature is that the JCAST has a larger screen so that a more verbose explanation of events that are occurring and instructions can be displayed. In the JCAST 1000 of the present invention, the screen 130 is a 17 cm TFT LCD acreen with VGA resolution of 480 by 640 pixels.

Hard Copy of Results

Recording of test data. The data recorded is pass/fail and the numbers that resulted in that pass/fail condition and other conditions during the test. A one or two page summary sheet will be generated either by the JCAST or a piece of software designed for a desktop computer running Microsoft Windows. The summary sheet will be HTML formatted and dynamically created based on what testing was performed during that testing session. Test data is stored until a data dump session. Then the data can optionally be deleted by the user. Pilot profiles can be entered, stored, and recalled. Profile may include, but are not limited to, remembering the gear that the pilot has, bar code ID numbers, etc. USB peripheral scanner may be implemented to be able to scan bar code IDs on hardware that requires testing. JCAST will know what type of testing needs to be done, pass/fail criteria, etc.

F-22 Rapid Decompression Training/Simulation: The JCAST will simulate aircrew egress at high altitude (F-22 capable). To do this, a pilot connects a G-Suit and a Mask to the unit. Ideally, when the simulation begins, the pilot should receive 2 PSIG or 4 PSIG (user selectable) to his/her G-Suit and 39 IWG to the mask, both instantaneously, or as close to a step increase as possible. The point of the testing is to expose the pilot to this impulse of high pressure before it actually happens. Due to this impulse in air flow, a large stored air charge will be necessary to make this happen. This is accomplished in one of two ways. The first way is to place a port on the control panel of the unit where the user can attach an extra bottle. This port provides the means to increase the accumulator volume as much as needed. The second way of accomplishing this task with a smaller amount of accumulator volume is to pre-fill the G-suit to a pressure that is undetectable to the pilot wearing the suit. The idea here is that even though the pressure is low, most of the mass of air is in the suit. Therefore, when the simulation occurs and 2 or 4 PSIG is applied to G-suit and 39 IWG to the face, a much smaller amount of stored air is needed and the application of the pressure seams realistic.

Summary of JCAST Specifications

Turning now to FIG. 10, FIG. 10 is a view of the features of the JCAST according to an embodiment of the present invention. As illustrated in FIG. 10, the JCAST of the present invention is portable, has unrestricted transport on military aircraft, eliminates the need for multiple test sets, is self-contained with no bottled gas required, performs self test and system verification, performs helmet/mask fitting and troubleshooting, has microphone and earphone testing capabilities, inflates the CSU 13 series anti-G (anti gravity) suit in less than one minute, provides proper pressure and flows to enable complete functional testing of aircrew life support equipment, is designed for In-shop, field and deployments, has a rugged design, is easily upgradeable, is battery powered, has a flat control panel that is easy to clean, has automated testing, has PBG breathing levels timeout for aircrew member safety, has redundant overpressure relief valves, is JSAM ready, is OBOGS ready, has F-22 rapid decompression testing capabilities, and can make minor repairs to the tester at the operational level.

Turning now to FIG. 11, FIG. 11 is a view of the testing capabilities of the JCAST according to an embodiment of the present invention. As illustrated in FIG. 11, the testing capabilities of the novel JCAST include 1) chemical/biological mask, 2) leak testing, 3) communication, 4) breathing/performance/fit, 5) regulator performance testing and 6) miscellaneous testing. The chemical/biological mask testing includes quantitative face-fit factor (QFF), CB integrity fit factor (face-fit independent), drink tube flow restriction, drink train leakage test, drink valve seat test, outlet valve test, low flow leakage testing, blower pressure output level and battery output level. The leak testing includes dynamic leak measurement and pressure decay (P-DROP). The communication testing includes listen/talk for all headsets, with intercom capability between technician and pilot, continuity test of microphone elements, earphone elements and cable harness, isolated test of amplifiers for amplified microphones and stereo (L/R) tone testing of earpieces. Breathing/performance/fit testing includes normal (3.25 in $H_2O$ max), 41M (where M stands for 1000) (4 in $H_2O$ at 5 LPM. Where LPM stands for liters per minute), 43M (6 in $H_2O$ at 5 LPM), 45M (8 in $H_2O$ at 5 LPM), and PBG (16-32 in $H_2O$) with simultaneous G-suit fill. The regulator performance testing includes nominal 70 psi or pounds per square inch supply, nominal 5 psi supply and limit testing. The miscellaneous testing includes combined respirator unit CRU/94 cracking pressure and EEU 2 A/P goggle power.

Turning now to FIG. 12, FIG. 12 is a view of the specifications of the JCAST according to an embodiment of the present invention. The mechanical case is a test equipment case with removable hinged cover. The output pressure specifications are 0-39 in $H_2O$ (IWG) for the mask port, 0-5 PSIG for the G-suit port and 3-90 PSIG for each of the three MMR ports. The test settings are normal 3.25 IWG maximum, 41M 4.0 IWG at 5 LPM, 43M 6.0 IWG at 5 LPM, 45M 8.0 IWG at 5 LPM, PBG 16.0-32.0 IWG, G-suit pressure (PBG or pressure breathing in Gs) 58+/−5 IWG, G-suit pressure (leak, pressure decay) 138+/−5 IWG. Operating temperature limits are 0 to 50 degrees Celsius and storage temperature from −40 to 75 degrees Celsius. The electrical input is 90-132 VAC/180-264 VAC with a frequency of 47 to 440 Hz.

The indicator specifications are mask port pressure 0 to 50 IWG, MMR port pressure 0 to 100 PSIG, G-suit port pressure 0 to 200 IWG, mask/MMR flow 0 to 10,000 sccm, leak indication via flow sensor 5.0 to 5.5 LPM and pressure decay leakage indication 0.05 to 2.0 LPM. Comm electrical specifications are active noise reduction (ANR) power 24 VDC, 0.2 A minimum, electrical Mic input current 8 mA maximum, 10 VDC bias. For acceptable continuity indication, dynamic microphone is 4.0 to 7.5 ohms, carbon microphone is 80 to 500 ohms, earphones are 8 to 15 ohms. For short indication, dynamic earphones are less than 2 ohms and less than 20 ohms for the carbon microphone.

Chemical/biological specifications are, for non-aerosol particle detection, acceptable QFF is no more than 2000, acceptable percentage leakage (CB integrity) is no more than 0.003%. Drink tube specifications are acceptable resistance, static flow pressure drop no more than 2.2 IWG at 2.2 LPM, acceptable flow, drink valve seated no more than 0.5 SCCM at 6 IWG and acceptable flow drink train leakage no more than 0.5 SCCM at 6 IWG. Outlet valve acceptable flow being no more than 15 SCCM at 1 IWG.

The metal case having a removable cover and decontamination capable, size 24 in long by 18 in deep and 16 in high with weight less than 75 lbs. Input requirements being 115 to 230 VAC 40-400 Hz 2 Amps, no compressed air or oxygen required, temperature limits 0 to 50 degrees C. for operation and −40 to 75 degrees C. for storage.

While the present invention has been particularly shown and described with reference to exemplary embodiments thereof, it will be understood by those of ordinary skill in the art that various changes in form and details maybe made therein without departing from the spirit and scope of the present invention as defined by the following claims.

What is claimed is:

1. A Joint Combined Aircrew Systems Tester (JCAST), comprising:

a display screen adapted to display text messages;

a plurality of audio test ports and a plurality of circuits adapted to test headsets and microphones for continuity, tones and current drawn;

a G-suit port adapted to connect to a G-suit;

a plurality of Man Mounted Regulator (MMR) ports;

a drink tube port adapted to connect to a drink tube;

a removable face form adapted to test mask integrity for nuclear, biological and chemical (NBC) masks; and an internal gas plumbing adapted to test MMRs, drink tubes, a G-suit, oxygen masks, and NBC masks for leaks, the JCAST being an integrated and portable unit, the internal gas plumbing including a volumetric leak test definition plumbing adapted to accurately detect and measure leaks in elastic bodies including NBC masks for leaks as small as 0.5 sccm by keeping an elastic device under test (DUT) under constant pressure throughout the test and measuring a pressure drop in an accumulator used to supply air mass to the DUT.

2. The JCAST of claim 1, the JCAST being adapted to test:

a quantitative fit factor for NBC masks via particle counting;

mask integrity via both particle counting and both pressurized and evacuated volumetric flow testing;

drink train integrity via both particle counting and both pressurized and evacuated volumetric flow testing;

drink tube seat both particle counting and both pressurized and evacuated volumetric flow testing;

drink tube restriction via flow restriction testing; and outlet valve seat via pressurized volumetric flow testing.

3. The JCAST of claim 1, wherein the volumetric leak test definition plumbing comprises:

a port adapted to allow for attachment to an elastic device under test (DUT);

a gas source;

a low flow regulator adapted to deliver an air mass to the DUT and to keep the DUT at a constant pressure, even when the DUT leaks;

at least one accumulator arranged between the regulator and the gas source and adapted to supply an air mass to the DUT via the regulator and the port, the at least one accumulator being further adapted to provide a condition where a pressure drop within the at least one accumulator and a quantity of air mass leakage have a known relationship; and an electrically controlled valve adapted to cut off the gas source from the at least one accumulator, the regulator and the port, the port being on an opposite side of the regulator than the at least one accumulator.

4. The JCAST of claim 3, the volumetric flow testing leak test being fully automated in that a single button push causes pressurization of a device under test and accumulator, closing of the electrically controlled valve, recording an initial and a final pressure within the at least one accumulator and calculation of a leak rate for the DUT.

5. The JCAST of claim 3, further comprising an apparatus adapted to perform the particle counting for the mask integrity testing, the apparatus comprising:
- a switching valve adapted to switch between an ambient sampling port and a mask sampling port;
- an alcohol soaked canister adapted to saturate particles received through the ports;
- a chilled condenser tube adapted to cause alcohol vapor to condense on the particles;
- a nozzle adapted to focus the particles;
- a laser light focused on an output of the nozzle; and
- a detector adapted to detect particle concentration by counting flashes produced by the particles interacting with the laser light.

6. The JCAST of claim 3, the at least one accumulator comprising a first accumulator having a first volume and a second accumulator of having a second and lesser volume, the JCAST being adapted to determine a leak rate of the DUT attached to the port by measuring a pressure drop in the first and the second accumulators and keeping track of elapsed time.

7. The JCAST of claim 6, the leak rate ($L_{DUT}$) for the DUT being determined by a process comprising:
- calibrating the internal gas plumbing by running a leak test on a standard leak source and recording after one minute calibration leak rate (Lc), ambient temperature ($T_{ac}$), time ($t_c$), accumulator gauge pressure at start of test ($P_{1c}$), accumulator gauge pressure at end of test ($P_{2c}$);
- calculating $C_{L1}=(P_1-P_2)/(Lc\cdot\Delta t\cdot T_a)$ and $C_{L2}=P_1$;
- storing $C_{L1}$ and $C_{L2}$;
- performing leak test for the DUT when current gauge pressure ($P_c$)>accumulator end pressure ($P_2$) and elapsed time ($t_c$)<t;
- reading and storing start pressure within the accumulator ($P_{1DUT}$) and end pressure within the accumulator ($P_{2DUT}$), temperature $T_{aDUT}$ and elapsed time $t_{DUT}$;
- calculating $L_{DUT}$ via one of $L_{DUT}=(P_{2DUT}-P_{1DUT})/(\Delta t_{DUT}\cdot T_{aDUT}\cdot C_{L1})$ and $L_{DUT}=(C_{L2}-P_{2DUT})/(\Delta t_{DUT}\cdot T_{aDUT}\cdot C_{L1})$ where; and
- reporting $L_{DUT}$.

8. The JCAST of claim 1, the JCAST being further adapted to perform a vacuum channel leak test measuring a leak rates as small as 0.05 sccm of a seal between an NBC mask and the faceform by a plumbing comprising:
- said faceform comprising vacuum channels at where an NBC mask is sealed to the faceform;
- an evacuated pressure source;
- a 150 cc accumulator;
- a 1 IWG differential pressure gauge arranged between the accumulator and the faceform and adapted to measure a pressure difference between the vacuum channels within the faceform and the accumulator; and
- at least two electrically activated valves adapted to cut off the evacuated pressure source from the accumulator, the differential pressure gauge and the faceform and to isolate the accumulator from the vacuum channels within faceform.

9. The JCAST of claim 8, the JCAST being adapted to perform a vacuum channel leak test whenever a volumetric flow leak test is being performed on an NBC mask, the JCAST being further adapted to abort the volumetric leak test and display a corresponding message when a leak rate in the vacuum channels is greater than 0.05 sccm.

10. The JCAST of claim 1, the volumetric leak test definition plumbing being further adapted to detect and measure leak rates in elastic bodies as small as 0.5 sccm by each of holding the elastic device under test at a constant pressure of +6 IWG (pressurized leak test) and at −6 IWG (evacuated leak test).

11. The JCAST of claim 10, the pushing of the single button on said JCAST automatically causes the JCAST to pressurize the DUT to are required test pressure, determine whether a pressure of the DUT has stabilized, read $P_{2DUT}$, $T_{aDUT}$ and $t_{DUT}$ and calculate $L_{DUT}$.

12. A Joint Combined Aircrew Systems Tester (JCAST), comprising:
- a display screen adapted to display text messages;
- a plurality of audio test ports and a plurality of circuits adapted to test headsets and microphones for continuity, tones and current drawn;
- a G-suit port adapted to connect to a G-suit;
- a plurality of Man Mounted Regulator (MMR) ports, the JCAST being adapted to output a pressure on the order of 90 PSIG for a sustainable breathing period through each of the plurality of MMR ports;
- a drink tube port adapted to connect to a drink tube;
- a removable face form adapted to test mask integrity for nuclear, biological and chemical (NBC) masks; and
- an internal gas plumbing adapted to test MMRs, drink tubes, a G-suit, oxygen masks, and NBC masks for leaks, the JCAST being an integrated and portable unit, the internal gas plumbing including a volumetric leak test definition plumbing adapted to accurately detect and measure leaks in elastic bodies including NBC masks for leaks as small as 0.5 sccm.

13. A method of determining a leak rate, comprising:
- providing internal gas plumbing comprising volumetric leak test plumbing adapted to run a volumetric flow testing leak test, the plumbing comprising a gas source, at least one accumulator, a low flow regulator adapted to maintain a constant pressure within a leaking, elastic device under test (DUT), the at least one accumulator being arranged between the regulator and the gas source, a port adapted to connect to the elastic DUT, the plumbing being adapted so that the port is arranged on a side of the regulator opposite to that of the at least one accumulator;
- attaching the elastic DUT to the port;
- pressurizing the accumulator and the DUT;
- closing a valve isolating the gas source;
- holding the DUT at a constant pressure by supplying an air mass from the accumulator to the DUT via the regulator and the port;
- recording a start and an end pressure within the accumulator; and
- calculating a leak rate for the DUT from the start and the end pressure within the accumulator and an elapsed time.

14. The method of claim 13, further comprising:
- calibrating the internal gas plumbing by running a leak test on a standard leak source and recording after one minute calibration leak rate (Lc), ambient temperature ($T_{ac}$), time ($t_c$), accumulator gauge pressure at start of test ($P_{1c}$), accumulator gauge pressure at end of test ($P_{2c}$);
- calculating $C_{L1}=(P_1-P_2)/(Lc\cdot\Delta t\cdot T_a)$ and $C_{L2}=P_1$;
- storing $C_{L1}$ and $C_{L2}$;
- performing leak test for the DUT when current gauge pressure ($P_c$)>accumulator end pressure ($P_2$) and elapsed time ($t_c$)<t by applying a constant pressure to the device under test and sensing and recording a pressure drop within the accumulator;

reading and storing start pressure within the accumulator ($P_{1DUT}$) and end pressure within the accumulator ($P_{2DUT}$), temperature $T_{aDUT}$ and elapsed time $t_{DUT}$;

calculating $L_{DUT}$ via one of $L_{DUT}=(P_{2DUT}-P_{1DUT})/(\Delta t_{DUT} \cdot T_{aDUT} \cdot C_{L1})$ and $L_{DUT}=(C_{L2}-P_{2DUT})/(\Delta t_{DUT} \cdot T_{aDUT} \cdot C_{L1})$ where; and reporting $L_{DUT}$.

15. The method of claim 13, the performing leak test for the DUT comprises:

connecting the DUT to said side of the regulator opposite to that of the at least one accumulator; and pushing a single button on said JCAST causing the DUT to be pressurized to a constant pressure of +6 IWG for a duration of the test.

16. An apparatus of measuring a leak rate of an elastic device under test (DUT), comprising:

a port adapted to allow for the elastic DUT to attach thereto;

a gas source;

a low flow regulator adapted to deliver an air mass to the DUT and to keep the DUT at a constant pressure, even when the DUT leaks;

at least one accumulator arranged between the regulator and the gas source and adapted to supply air mass to the DUT via the regulator and the port, the at least one accumulator being further adapted to provide a condition where pressure drop within the at least one accumulator and an air mass leakage from the accumulator to the DUT via the regulator have a known relationship; and an electrically controlled valve adapted to cut off the gas source from the at least one accumulator, the regulator and the port, the port being on an opposite side of the regulator than the at least one accumulator.

17. The apparatus of claim 16, the regulator being adapted to keep the DUT at a constant −6 IWG for a duration of a leak test.

18. The apparatus of claim 16, the at least one accumulator having a volume that provides a sufficient span in pressures within the at least one accumulator during a leak test so that a leak having a leak rate of 0.5 sccm within the DUT can be detected and measured accurately.

19. The JCAST of claim 16, comprising:

the valve comprised of an electrically controlled valve adapted to cut off the gas source from the at least one accumulator, the regulator and the port; and the accumulator comprised of a first accumulator having a first volume and a second accumulator of having a second and lesser volume, the JCAST being adapted to determine a leak rate of the DUT attached to the port by measuring a pressure drop in the first and the second accumulators and keeping track of elapsed time.

20. A Joint Combined Aircrew Systems Tester (JCAST), comprising:

a display screen adapted to display text messages;

a plurality of audio test ports and a plurality of circuits adapted to test headsets and microphones for continuity, tones and current drawn;

a G-suit port adapted to connect to a G-suit;

a plurality of Man Mounted Regulator (MMR) ports;

a drink tube port adapted to connect to a drink tube;

a removable face form adapted to test mask integrity for nuclear, biological and chemical (NBC) masks; and an internal gas plumbing adapted to test devices under test (DUTs) including MMRs, drink tubes, G-suits, oxygen masks, and NBC masks for leaks, the JCAST being an integrated and portable unit, the internal gas plumbing including a volumetric leak test definition plumbing adapted to detect and measure leaks in said DUTs as small as 0.5 sccm while the DUTs are pressurized to a pressure of less than 0.5 inches of Hg.

21. The JCAST of claim 20, the DUTs being elastic bodies.

* * * * *